April 9, 1957 R. REQUA 2,788,103
SELECTIVE DRIVE HUBS
Filed Dec. 20, 1954 2 Sheets-Sheet 1

INVENTOR.
ROY REQUA
BY Martin E. Anderson
ATTORNEY

April 9, 1957  R. REQUA  2,788,103
SELECTIVE DRIVE HUBS
Filed Dec. 20, 1954  2 Sheets-Sheet 2
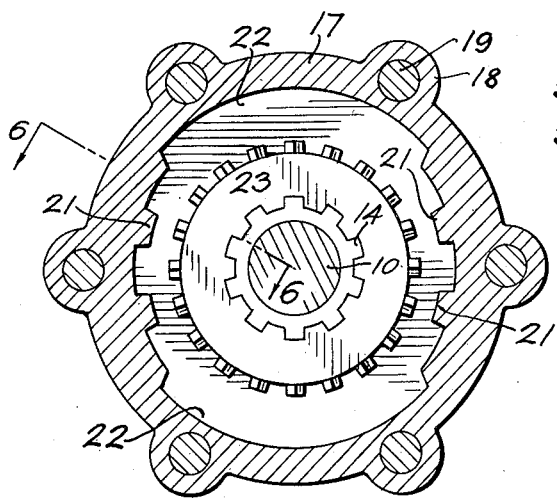
Fig. 4.
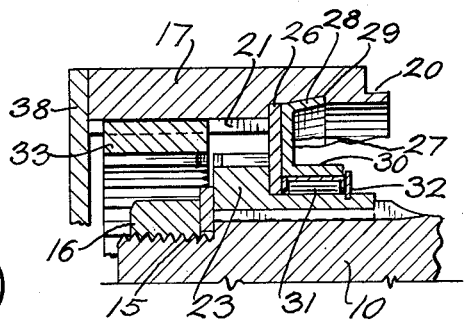
Fig. 6.
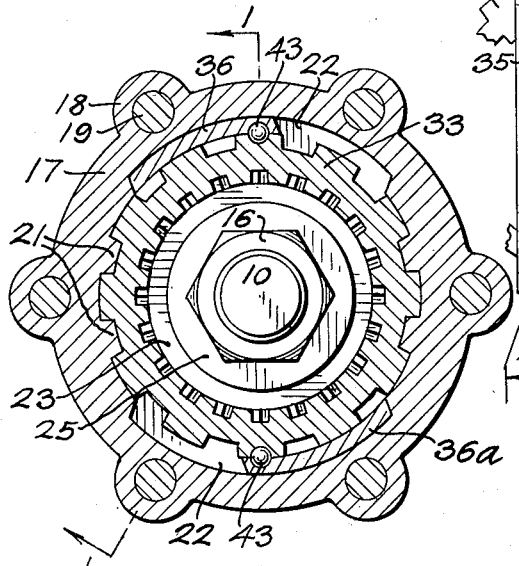
Fig. 5.
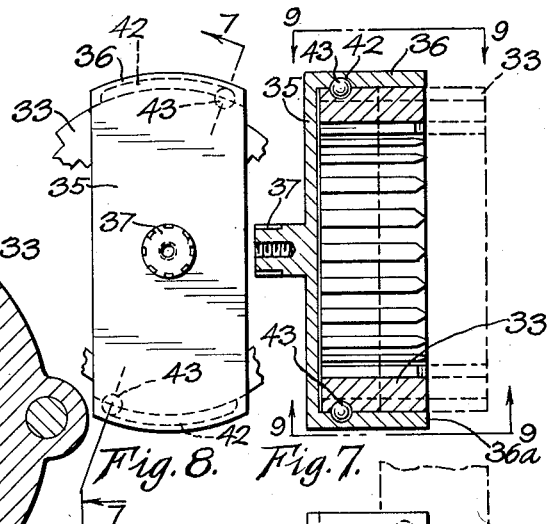
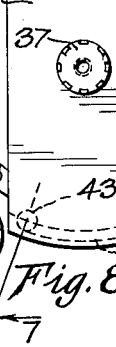
Fig. 8.  Fig. 7.
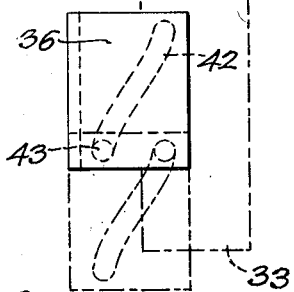
Fig. 9.
INVENTOR.
ROY REQUA
BY Martin E. Anderson
ATTORNEY

United States Patent Office 2,788,103
Patented Apr. 9, 1957

2,788,103

SELECTIVE DRIVE HUBS

Roy Requa, Denver, Colo., assignor to Free Lock Corporation, Denver, Colo.

Application December 20, 1954, Serial No. 476,296

3 Claims. (Cl. 192—67)

This invention relates to improvements in four wheel drive automotive vehicles and has reference more particularly to means for uncoupling the front wheels from the drive axle so that the axle, universal and front axle differential can remain stationary for highway travel and so that the front wheels can be readily coupled to the front wheel drive axle when four wheel drive is required.

There are various makes of trucks and/or automobiles that are constructed for four wheel drive, among the best known is the automobile referred to by the trade name "Jeep." Such automobiles are provided with a transfer case or mechanism that couples the front wheels to the power shaft at a point near the transmission gear housing, with the result that when the front wheels are disconnected from the power they continue to rotate the front drive axle, the universal, and the front axle differential at all times.

It is the object of this invention to produce a coupling device in the nature of a hub that can be substituted for the ordinary coupling disk that is now employed to effect a driving connection.

Having thus, in a general way, pointed out the objects of the invention, the invention will now be described in detail for which purpose reference will be had to the accompanying drawings in which the invention has been illustrated, and in which:

Figure 4 is a transverse section taken on line 4—4 Figure 1;

Figure 5 is a section taken on line 5—5 Figure 1;

Figure 6 is a fragmentary sectional view taken on line 6—6 Figure 4;

Figure 7 is a section taken on line 7—7 Figure 8 and is similar to Figure 1 where the same elements are similarly shown;

Figure 8 is an elevational view of the clutch arm, looking towards the right in Figure 7; and Figure 9 is an end elevational view looking in the direction of arrows 9—9 Figure 7.

Figure 1:
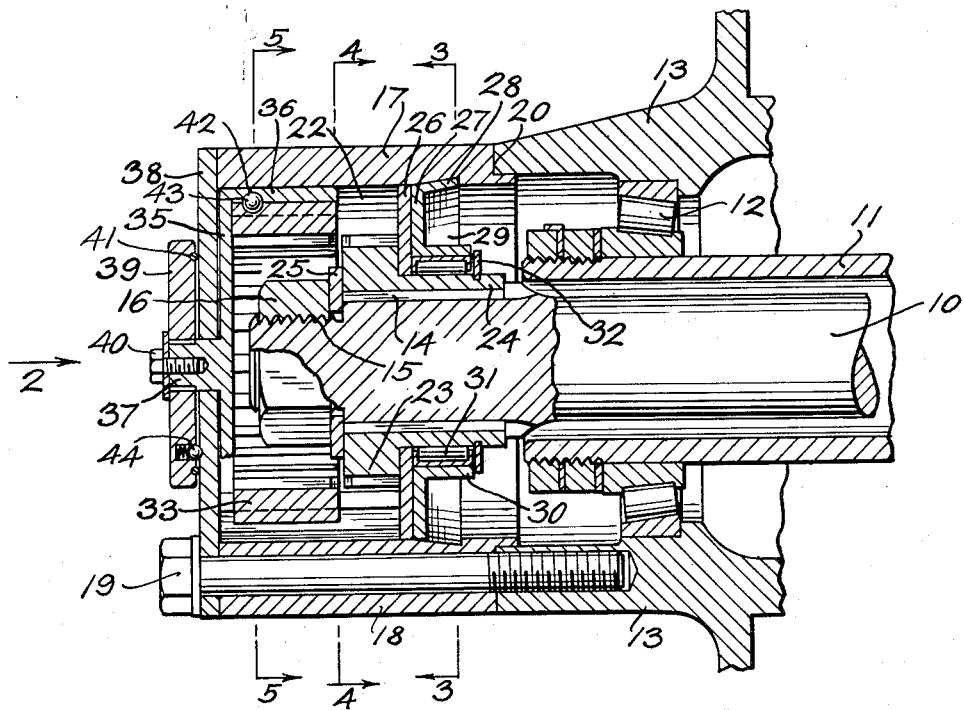
Figure 1 is a substantially diametrical section of the outer end of the front drixe axle, the coupling device and a portion of a conventional front wheel, taken on line 1—1 Figure 5.
Figure 2:
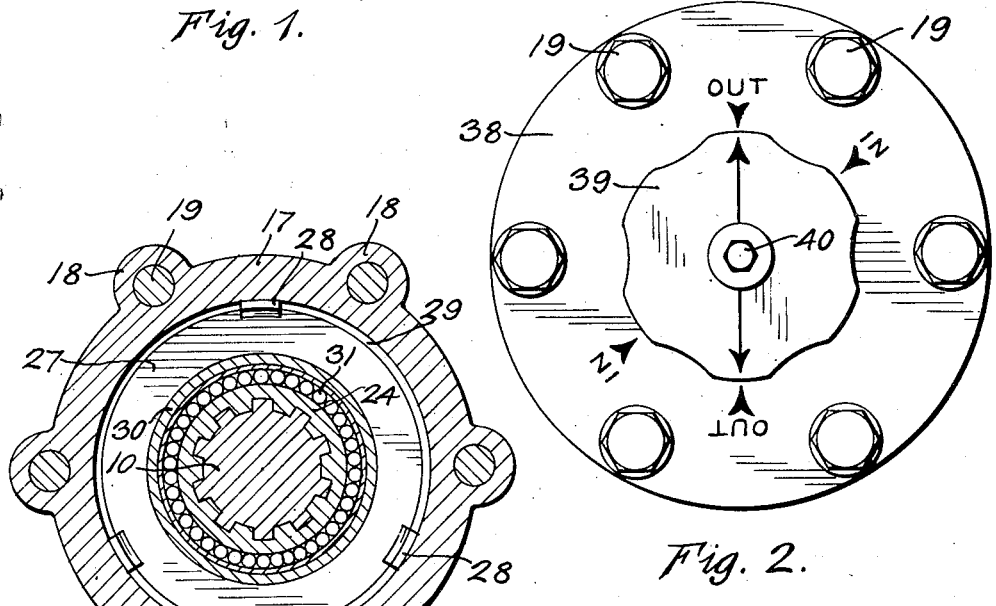
Figure 2 is an elevational view looking in the direction of arrow 2 in Figure 1.
Figure 3:
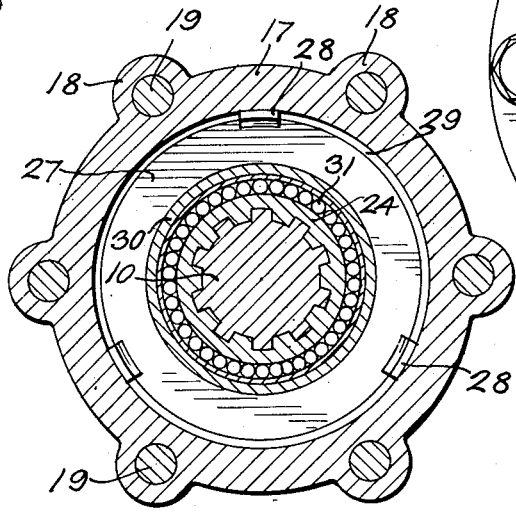
Figure 3 is a transverse section taken on line 3—3 Figure 1.

Referring now to the drawing, reference numeral 10 designates the front drive shaft of a front wheel drive and reference numeral 11 the tubular shaft that extends from the brake drum while numeral 12 designates the outer front wheel bearing. A portion only of the wheel hub has been shown and designated by numeral 13. Shaft 10 has a splined section 14 that terminates in a threaded portion 15 to which nut 16 is applied. The coupling device to which this invention relates and which will now be described consists of a hollow cylindrical body 17 whose outer surface is provided with a plurality of tubular flutes 18 for the reception of bolts 19 that serve to attach the body to the wheel hub as shown in Figure 1. The hollow body is provided at its inner end with a rabbet 20 for the reception of the outer end of the wheel hub as shown in Figure 1. Member 17 is provided intermediate its ends with internal splines 21 that are most clearly shown in Figures 4 and 5 from which it will be seen that the splines occur in two diametrically positioned groups spaced by two arcuate recesses 22 for a purpose that will hereinafter appear. Positioned on the splined section of the shaft is a splined coupling member 23 having an internally splined tubular hub 24. Said coupling member is secured in position by means of nut 16 and lock washer 25. Gear 23 is positioned within the cylindrical body, as shown in Figure 1, and is positioned in contact with a thrust washer 26 which is held against the inner ends of splines 21 by a bearing retainer 27 that has three equiangularly spaced lugs 28 which "snap" into groove 30. The retainer ring has a cylindrical hub 30 whose internal diameter is greater than the outside diameter of hub 24, providing an annular space for a Torrington needle bearing 31, as shown in Figures 1 and 6. The assembly so far described is shown in section in Figures 1 and 6 and to this must be added coupling means which will now be described.

A coupling ring 33 has its outer surface provided with splines that engage and cooperates with splines 21 and is slidable along splines 21 from the neutral or uncoupled position shown in Figure 6 to a position in which it laps the external splines on member 23; this position has been indicated by dotted lines in Figures 7 and 9. When ring 33 is in overlapping engagement with the splines on member 23 the shaft and the wheel are coupled for conjoint rotation but when in the position shown in Figures 1 and 6 the wheel is free to rotate about axle 11. The means provided for reciprocating ring 33 consists of a barrel cam clutch operator like that shown in Figures 7, 8 and 9 and consists of a flat bar 35 whose ends 36 and 36a extend at right angles thereto and whose outer surfaces are curved to fit the curved bottoms of recesses 22, as shown in Figure 5, and whose inner surfaces fit the outer surfaces of the splines on the outer periphery of the coupling ring. A splined trunnion 37 extends outwardly from the center of bar 35 and through an opening in end closure plate 38. A gear shift hand wheel 39 is splined to 37 and is held in place by a screw and washer 40. The parts are provided with suitable grease seals wherever needed and one has been designated by numeral 41 in Figure 1. Referring now in particular to Figures 7, 8 and 9, also Figures 1 and 5, it will be seen that the concave surfaces of ends 36 and 36a are each provided with a helical cam groove 42 and that the outer surface of two diametrical splines on coupling ring 33 have a depression for a steel ball 43 that projects into the corresponding cam groove, which extends helically as above mentioned. When bar 35 is rotated clockwise from the position shown in Figures 1 and 5 the action of the ball in its movement along grooves 42 shifts the coupling ring towards the right (Figures 1 and 6) until the splines on the inner surface of ring 33 lap the teeth on the periphery of member 23 thereby effecting a coupling of body 17 and the shaft whereby the shaft and wheel will rotate as a unit. Attention is called to the smaller pitch angles at the ends of the cam grooves which make it easier to start the shifting movement.

A spring detent like that designated by numeral 44 is provided on the hand wheel to releasably hold the barrel cam in any desired position.

Applicant also desires to call particular attention to the construction of the body member 17 which has been designed in such a manner that it requires no complicated and expensive machine operations; the splines and recesses 22 can be provided by the use of suitable broaches leaving only the cylindrical surface to the right of splines 21 (Fig. 6) and groove 29 to be formed by a lathe during the operation preparatory to the broaching operation.

What is claimed as new is:

1. A clutch for use in coupling a freely rotatable vehicle wheel to a drive shaft having a splined end section, comprising in combination an elongated cylindrical hub body having an inner and an outer end whose inner surface is splined to a point about two-thirds the distance towards the inner end, diametrically positioned arcuate recesses of greater radial depth than the splines extending inwardly from the outer end, separating the splines into two diametrically opposed groups, that part of the inner surface from the inner ends of the splines to the inner end of the hub being cylindrical and of a diameter equal to the diameters of the recesses, a thrust washer positioned in the cylindrical section in engagement with the inner ends of the splines, an externally splined coupling member of an outside diameter less than the inside diameter of the splined section and having an elongated internally splined hub extending from one side projecting through the thrust washer towards the inner end of the hub, a needle bearing surrounding the hub one end of the bearing abutting the inner surface of the thrust washer, the hub having a groove adjacent the inner end of said bearing and a snap ring positioned in the groove forming an abutment for the bearing, a retaining ring provided on one side with a tubular hub that telescopes over the needle bearing, positioned in contact with the inner surface of the thrust washer and provided with means effecting an interlock with the cylindrical surface of the hub to hold the thrust washer in a fixed position, a coupling ring having its peripheral surface splined to engage the internal splines on the hub, the inner surface of the ring having teeth sized and positioned to telescope the splines on said coupling member to effect a coupling between the spur gear and the hub, a closure for the outer end of the hub, and means accessible from the outside of the hub for moving the coupling ring to and from coupling position.

2. A device in accordance with claim 1 in which the means for moving the coupling ring comprises a barrel cam having arcuate lateral projections positioned in the arcuate recesses and of less width than the recessed, lapping the outside of the coupling ring, and means operatively interconnecting the said projections to convert rotary movement of the cam into straight line motion of the coupling ring.

3. An article of manufacture comprising an elongated hollow hub body having inner and outer ends having its inner surface provided with splines extending at least half the distance from its outer to its inner end, the inside having diametrically positioned arcuate recesses of greater depth than the depth of the splines dividing the latter into two diametrically positioned groups, that part between the ends of the splines and the inner end of the hub being cylindrical and of a diameter at least as great as the diameters of the bottoms of the recesses.

References Cited in the file of this patent
UNITED STATES PATENTS 2,684,140    Warn _____ July 20, 1954